July 2, 1929.                J. C. KARNES                1,719,552
                      TELESCOPIC SIGHT FOR GUNS
                  Filed June 7, 1926        2 Sheets-Sheet 1
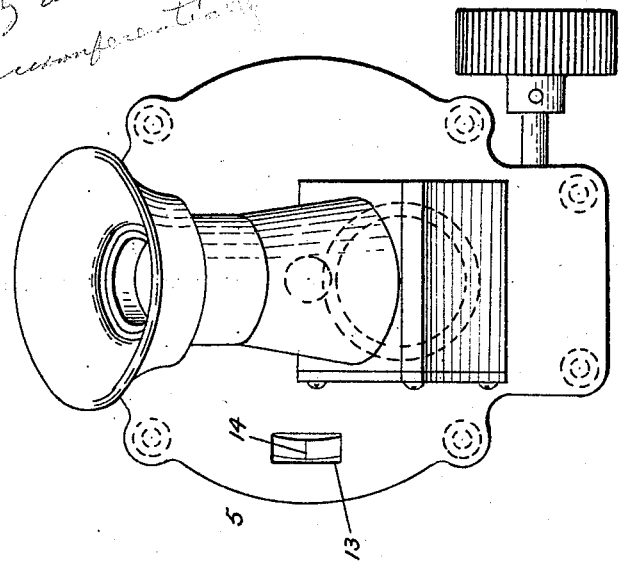
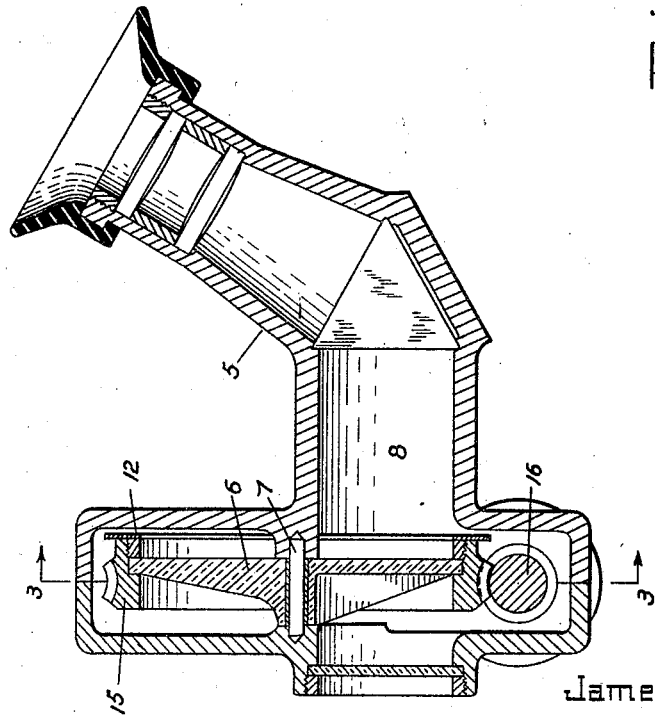
Inventor
James C. Karnes
By W. N. Roach
Attorney July 2, 1929.  J. C. KARNES  1,719,552
TELESCOPIC SIGHT FOR GUNS
Filed June 7, 1926   2 Sheets-Sheet 2
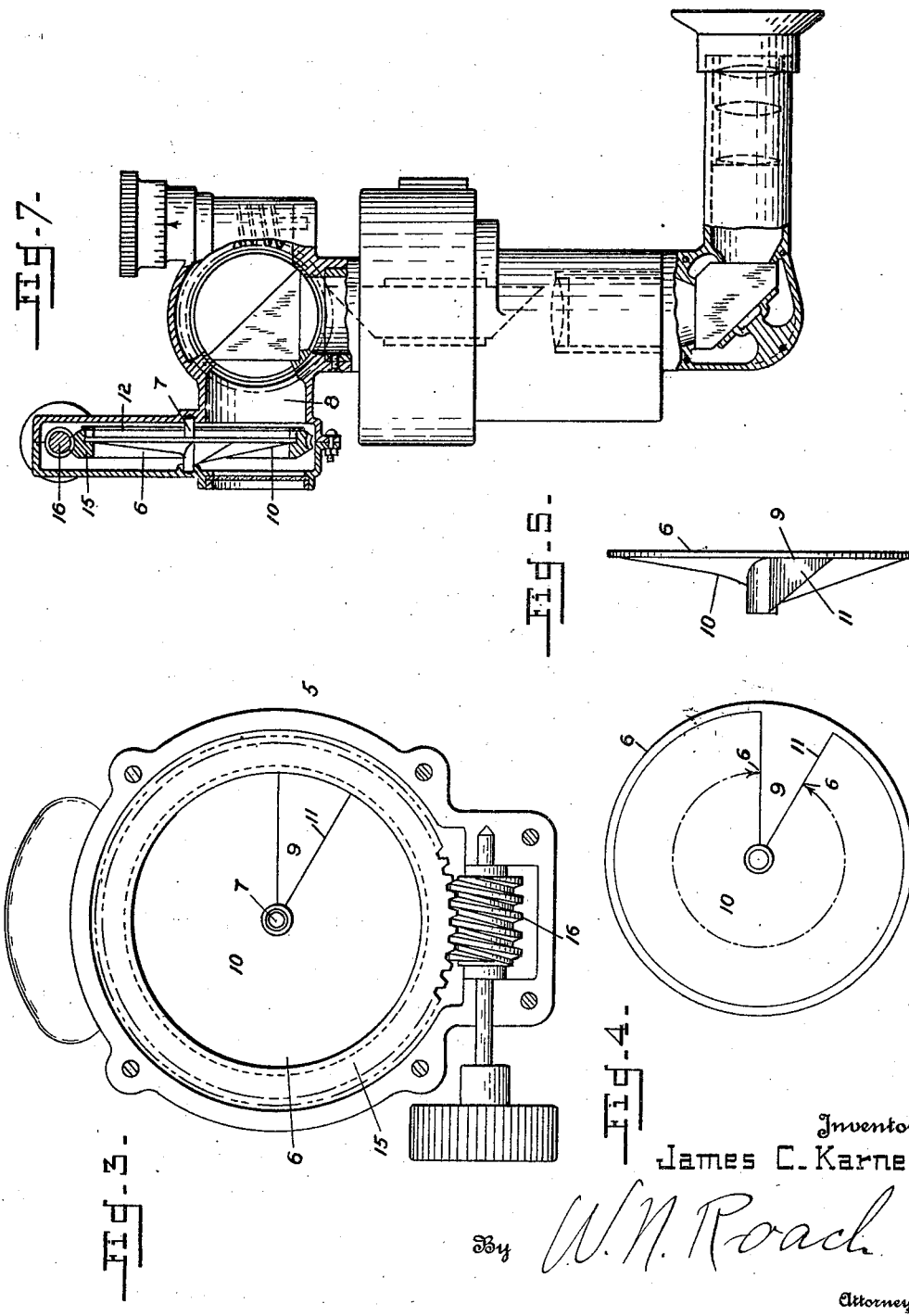
Inventor
James C. Karnes
By W. N. Roach
Attorney

Patented July 2, 1929.

1,719,552

UNITED STATES PATENT OFFICE.

JAMES C. KARNES, OF BUFFALO, NEW YORK.

TELESCOPIC SIGHT FOR GUNS.

Application filed June 7, 1926. Serial No. 114,375.

(GRANTED UNDER THE ACT OF MARCH 3, 1883, AS AMENDED APRIL 30, 1928; 370 O. G. 757.)

The invention described herein, if patented may be manufactured and used by or for the Government for governmental purposes without the payment to me of any royalty thereon.

The subject of this invention is a telescopic sight for guns.

In laying a gun in elevation the usual procedure consists in sighting on the target, depressing the sight an amount equal to the desired angle of elevation and then elevating the gun until the sight is again on the target.

Instead of moving the sight as a unit I propose in the present invention to incorporate a prism or series of prisms presenting a constantly changing angular face with respect to the optical axis of the instrument whereby the line of sight only is diverted without imparting any motion whatsoever to the sight mount.

With these and other objects in view which will appear as the description proceeds, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings, wherein:

Fig. 1 is a longitudinal sectional view of a sighting instrument equipped with my improved prism;

Fig. 2 is a view in rear elevation thereof;

Fig. 3 is a sectional view on the line 3—3 of Fig. 1;

Figs. 4 and 5 are, respectively, plan and side elevational views of the prism;

Fig. 6 is a diagrammatic view illustrating the angular face of the prism on the line 6—6 of Fig. 4; and Fig. 7 is a view in elevation, partly in section illustrating the application of the prism to a panoramic sight.

In the drawings like characters of reference designate like parts throughout the several views.

Referring to Fig. 1 there is shown a telescope 5 which may be of any suitable type and which when used on a gun is adapted to be mounted for cross leveling movement in any approved manner.

In the forward portion of the instrument is rotatably mounted an annular prism 6 whose axis 7 is disposed without the light receiving tube 8 so that only a radial portion of the prism will be exposed.

The prism is so formed that on rotation a constantly changing angular face will be brought into the optical axis of the instrument. The portion of the prism indicated by the line 9 has parallel sides, and from this point the prism is cut to afford a gradually increasing angular face 10 until the maximum inclination is reached on the line 11.

Inasmuch as the sighting instrument is fixed to the gun, it is evident that when the gun is on the datum plane or at zero range and the line of sight is parallel to the axis of the bore, that the image of a target at zero range must be received undeflected by the prism and hence the portion indicated by the line 9 corresponds to zero range. If the gun is elevated, it is obvious that a tarket at zero range would not be in the field of view of the instrument and that in order to see the target the line of sight must be deviated from parallelism with the axis of the bore, and this is accomplished by simply rotating the prism until the focal point possessing the proper inclination is in the optical axis of the instrument when the target will again be in view. Accordingly, the portion of the prism designated at 11 possessing the maximum inclination corresponds to the maximum range or elevation. The amount of rotation of the prism is indicative of the elevation imparted to the gun and may be measured in values of range and angle of site or in values of quadrant elevation by providing a graduated scale 12 rotatable with the prism and visible through a window 13 bearing an index mark 14. In order to provide for rotating the prism, a worm wheel 15 is secured to the periphery thereof whereby it may be actuated by a worm 16 journaled in the tube.

In operation the prism is rotated until the announced range on the scale is brought in register with the index mark 14 and the observer then elevates the gun until he sees the target.

The prism may equally well be used with a panoramic sight as illustrated in Fig. 7.

While I have shown the prism as being cut from a single block it is evident that a series of prisms each having a different angular value might be employed or instead of the rotatable prism I may use a pivoted or tilting or sliding prism whose movement into focus may readily be measured.

I claim:

1. A gun sight embodying a tube adapted to be fixed to a gun with its optical axis parallel to the axis of bore, an annular prism rotatably carried by the tube and having its axis without the tube, a portion of said prism formed with parallel sides and the remainder with a constantly changing angular face, means for rotating the prism, a scale graduated in values of angular elevation secured to the prism and an index against which the scale is read.

2. A gun sight embodying a telescope, a prism carried thereby and rotatable to present a constantly changing inclined face in the optical axis of the telescope and means for interpreting the inclination in terms of angular elevation.

3. An optical sighting instrument including a support, a prism in the support having a face whose profile is continuously changed with respect to the axis of transmission of light, means for displacing the prism to present a particular portion of the profile in the axis of transmission and means for indicating such displacement in terms of angular elevation.

JAMES C. KARNES.